United States Patent [19]

Montalbano

[11] Patent Number: 5,042,313

[45] Date of Patent: Aug. 27, 1991

[54] CONVERSION OF ROTATIONAL OUTPUT TO LINEAR FORCE—A TRANSMISSION

[76] Inventor: Paul J. Montalbano, 121 Sheraden Ave., Staten Island, N.Y. 10314

[21] Appl. No.: 469,322

[22] Filed: Jan. 24, 1990

[51] Int. Cl.$^5$ .............................................. F16H 33/20
[52] U.S. Cl. ........................................ 74/84 R; 74/61
[58] Field of Search ................. 74/84 R, 84 S, 61, 87, 74/828; 180/7.1; 366/166, 128

[56] References Cited

U.S. PATENT DOCUMENTS

| | | | |
|---|---|---|---|
| 3,913,409 | 10/1975 | Opderbeck | 74/61 |
| 4,241,615 | 12/1980 | Ryan | 74/61 |
| 4,856,358 | 8/1989 | Montalbano | 74/84 R |

*Primary Examiner*—Allan D. Herrmann
*Assistant Examiner*—David W. Laub

[57] ABSTRACT

A transmission device for converting rotary motion into linear force by varying the centers about which the weights rotate comprising two impellers (off-centered weights) which rotate in opposite directions. Impellers will be mounted within a rocker element which will rock back and forth in a controlled sequence. The amplitude that the rocker element rocks will be controlled by a cam which will be directly geared to a large gear. The impellers will also be geared to the same large gear which will rotate at a controlled speed. However, the speed of the impellers will be constantly changing. As the rocker element rocks in the same direction as the large gear the speed of the impellers will decrease and increase when the rocker element rocks in the opposite direction of the large gear. A clutch device will connect the large gear to a second large gear which will be equipped with a large flywheel and provided with a source of power. Output force will be controlled by either varying the base speed of the large internally toothed gear and flywheel.

12 Claims, 8 Drawing Sheets

| 90° | 180° | 270° | 360° |
| POSITION 1 | POSITION 2 | POSITION 3 | POSITION 4 |
| FIG.7A | FIG.7B | FIG.7C | FIG.7D |

FIG.9

CONVERSION OF ROTATIONAL OUTPUT TO LINEAR FORCE—A TRANSMISSION

If we take a circle and select two points on the circumference, reasonably close, and then draw two radial lines to the center of the circle we get an inclusive angle. If we than, using the same two selected points, draw two new radial lines double in length to a new center we would find that the inclusive angle generated by doubling the radius would be approximately half the size of the original angle. If we look at the formula for centrifugal force: $C.F. = W/g \times R \times \overline{\omega}^2$ and assume the time it takes to go from the first point to the second to be the same in both cases, we can see that R is the radius and $\overline{\omega}^2$ is a function of the inclusive angle. It now becomes evident that by increasing the radius we decrease the centrifugal force output significantly.

The present invention relates to a device which will produce a linear directional force by mechanically manipulating the centers about which the weights rotate. This is achieved by having a machine, which can be considered to be a transmission, which will have the capability of propelling weights, not in a circle, but rather in a modified elliptical path modified so that the top curvature of the ellipse differs from the bottom curvature of the ellipse. It is by the variable centrifugal forces that are generated by having the weights follow the different curved paths of the ellipse that a linear force will be produced.

My invention is comprised of three basic elements. First, I increase and decrease the rotational speed through which the impellers traverse.

Second, through a cam device, I control the acceleration and velocity rates as well as the displacement angle for the rocker element in which the rotating impellers are housed.

Third, since the geometric shape of the curved paths through which the impellers traverse will be that of a modified ellipse, at any point on the curve the radius around which the impeller-s rotate will change producing a variable centrifugal force output. It is in this way that I release energy in a controlled manner so as to result in a linear force.

Also included in the machine and paramount to its design are a large flywheel and a clutch. The purpose of the flywheel is to counteract the large clockwise and counter clockwise torques imposed on the machine during operation. The purpose of the clutch is to provide a means for quickly starting and stopping machine.

Output force will be controlled by varying the base speed of the large gear and flywheel.

This invention relates to a transmission device for converting rotational output to linear force by the controlled directional release of energy to provide a source of power.

It is amongst the primary objects of this invention to devise a transmission for converting rotational output to linear force particularly as a source of vehicular power.

It is still another important object of the present invention to create linear force from rotational output as a power source to accomplish work of any nature.

Yet another object of this invention is to provide a source of power which can be used as a tool in robotics.

Other objects and advantages of the invention will become apparent from what is set forth in the following specification and accompanying drawings wherein.

Figure 1:
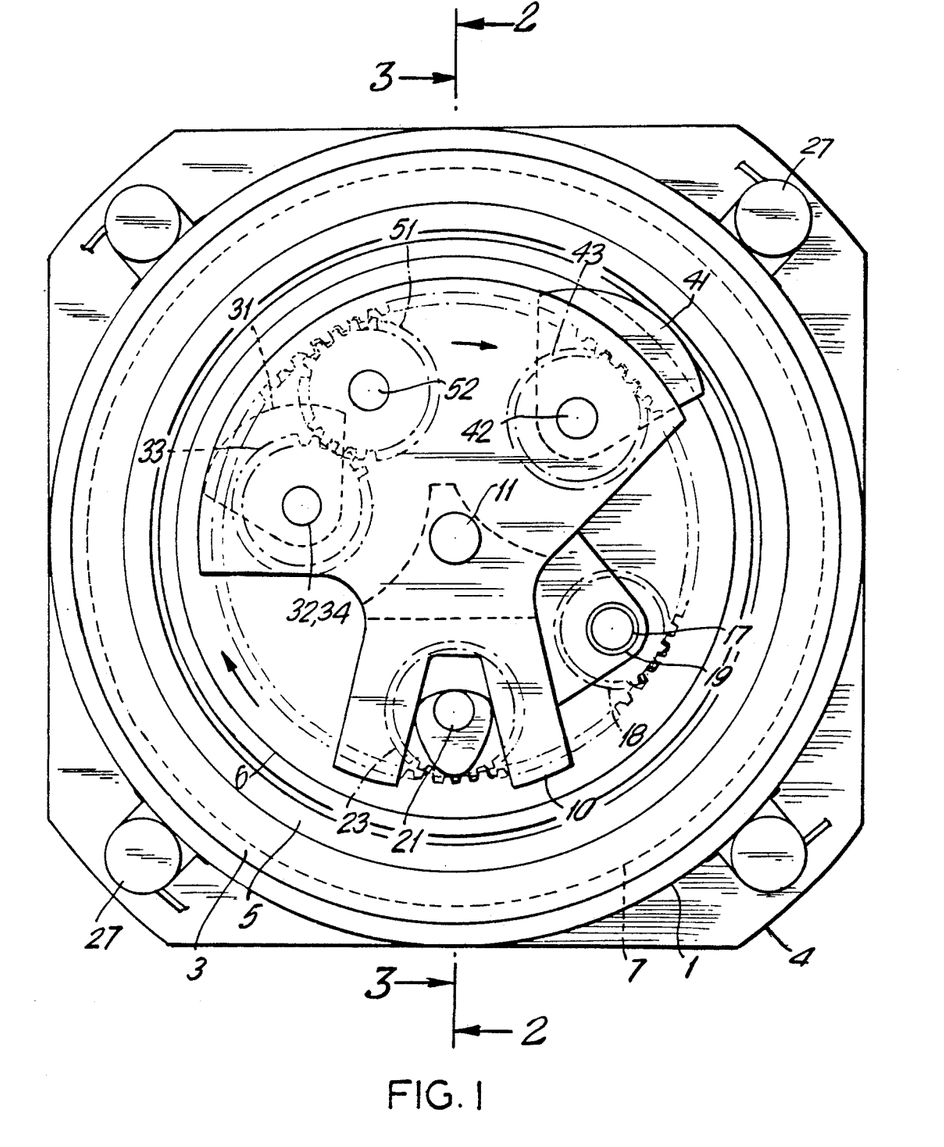
FIG. 1 is the top view of an embodiment of my machine (with top plate removed).
Figure 2:
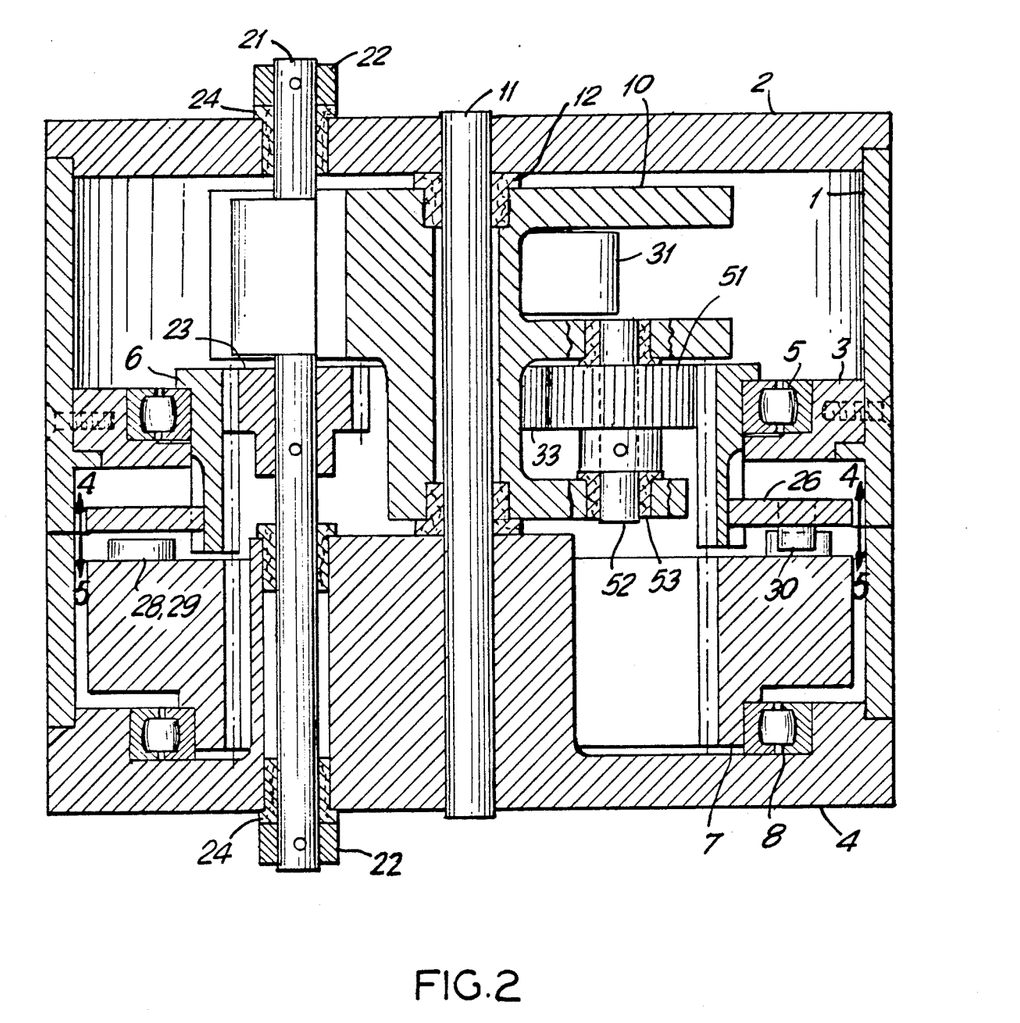
FIG. 2 is a sectional view taken on Line 2—2 of FIG. 1.
Figure 3:
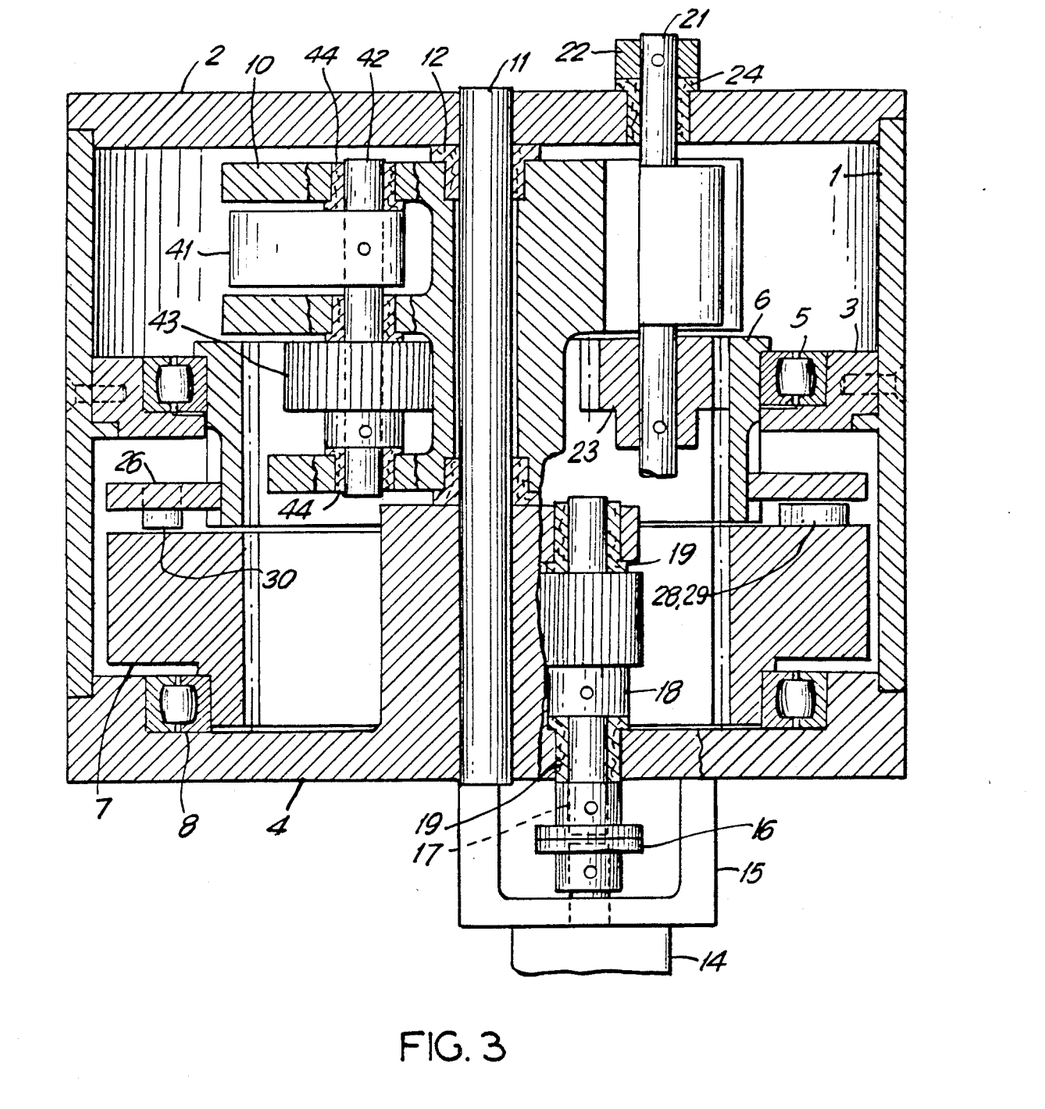
FIG. 3 is a sectional view taken on Line 3—3 of FIG. 1.
Figure 4:
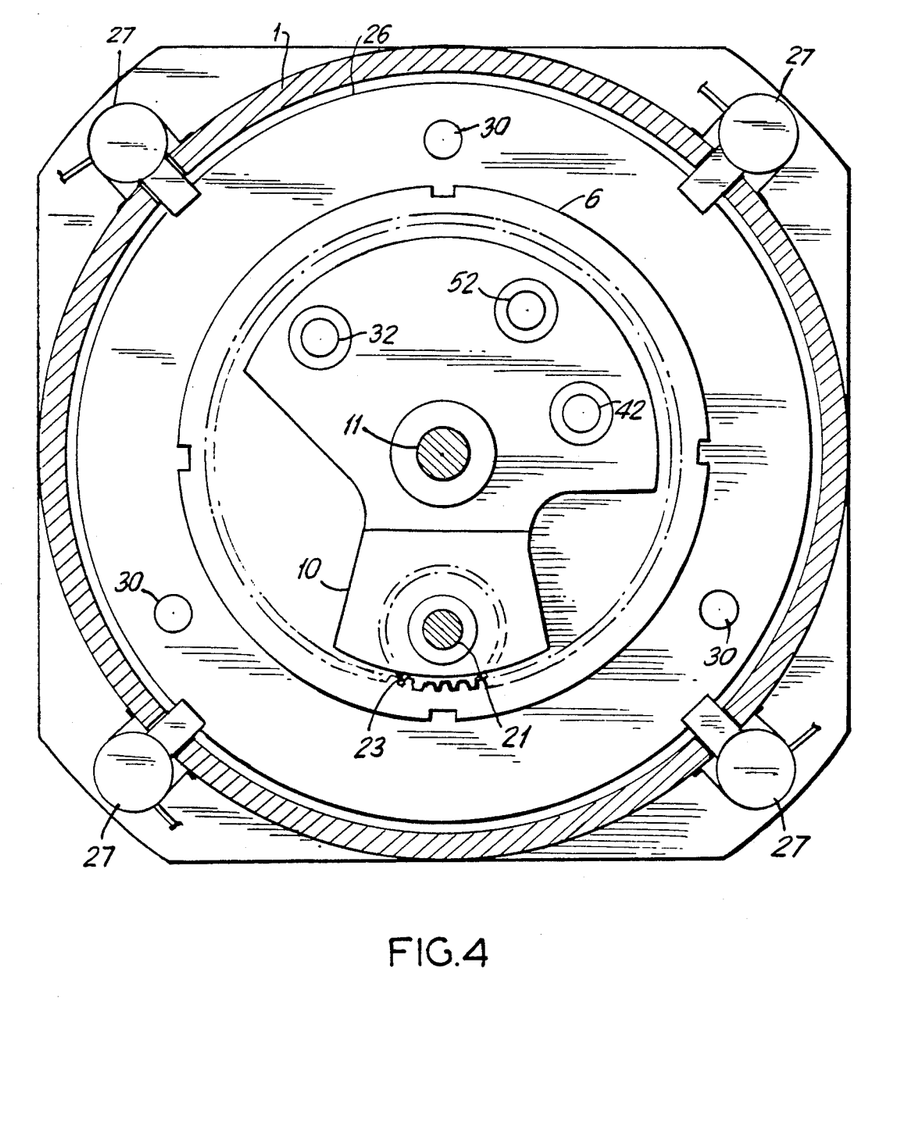
FIG. 4 is a sectional view taken on Line 4—4 of FIG. 2.

Referring to the embodiment of the machine as shown in FIGS. 1 through 6, a power source consisting of either a motor or engine 14, shown in FIG. 3, mounted on bracket 15 which is mounted to bottom plate 4 drives through a coupling 16 motor drive gear 18 which is keyed and pinned to shaft 17. Shaft 17 rotates in two oil impregnated bushings 19 which are housed in bottom plate 4. Motor drive gear 18 drives large lower gear 7 which is a combination large internally toothed gear and large flywheel. Large lower gear 7 is supported in bearing 8 which is mounted to bottom plate 4.

A clutch device connects large lower gear 7 to large upper gear 6, which are shown in FIGS. 2 and 3 to be the same size; however, large upper gear 6 can be constructed either larger or smaller than large lower gear 7.

Figure 5:
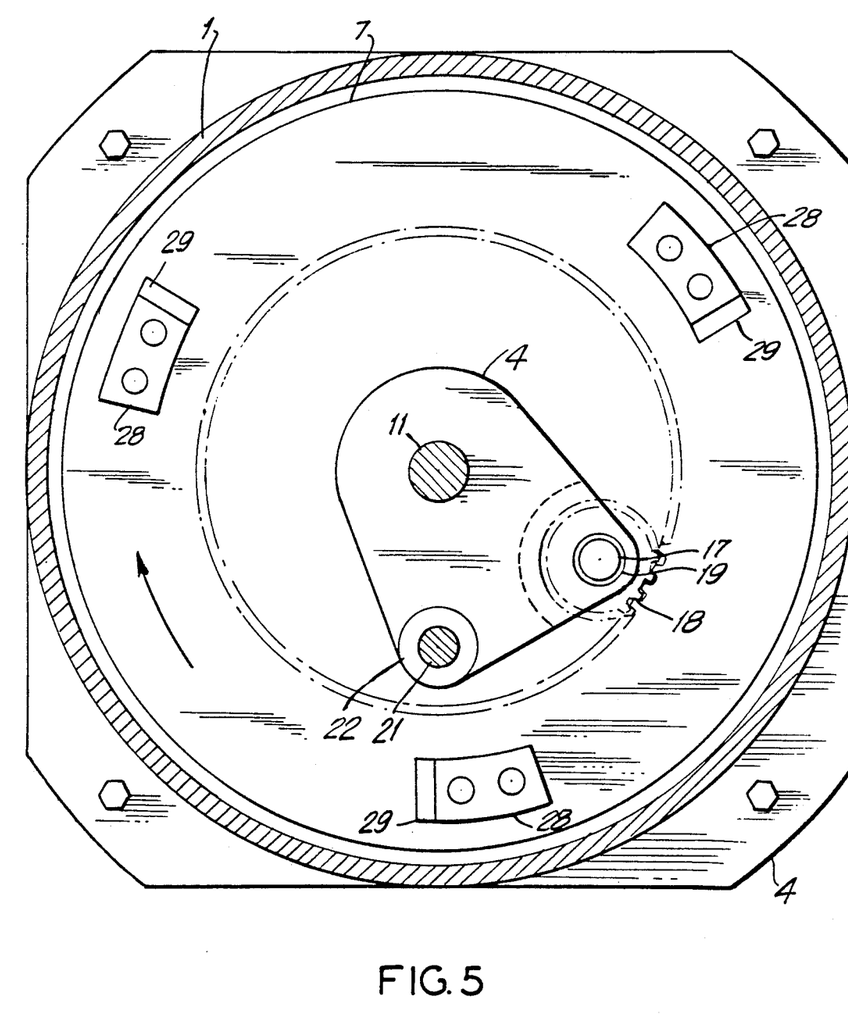
FIG. 5 is a sectional view taken on Line 5—5 of FIG. 2.
Figure 6:
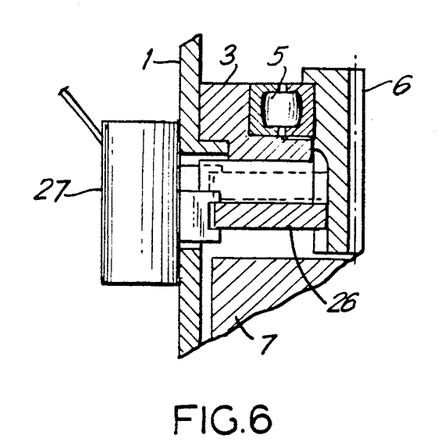
FIG. 6 is a detail of actuator installation.
Figure 7A:
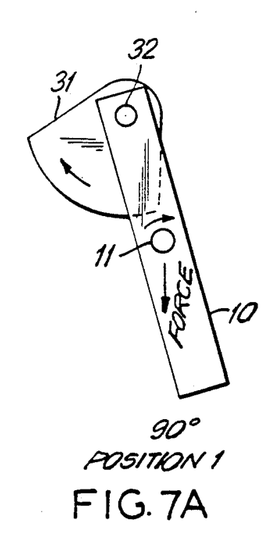
FIG. 7A through 7D schematically show various positions of the lead impeller in the engine cycle.
Figure 7B:
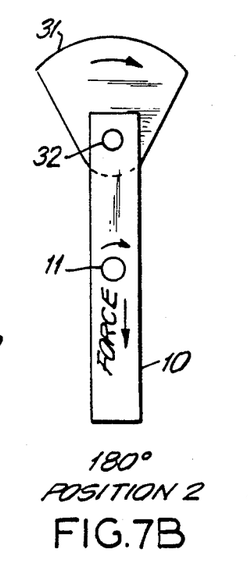
Figure 7C:
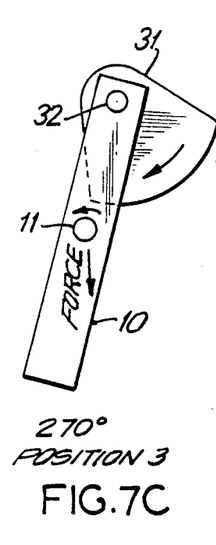
Figure 7D:
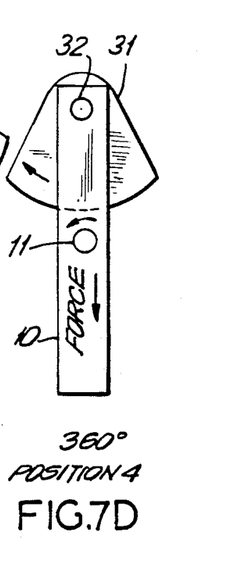
Figure 8A:
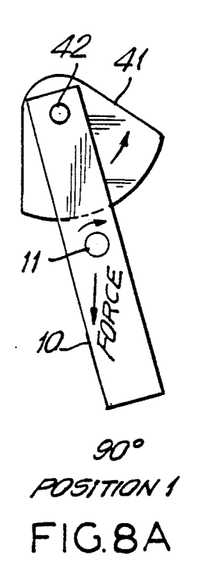
FIG. 8A through 8D schematically show various positions of the drive impeller in the engine cycle.
Figure 8B:
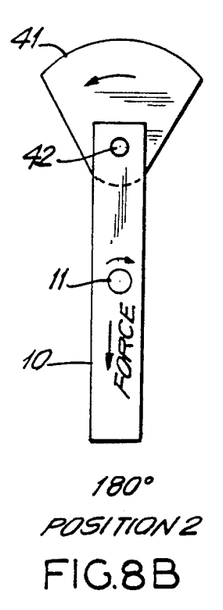
Figure 8C:
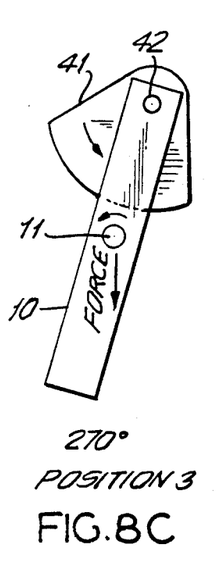
Figure 8D:
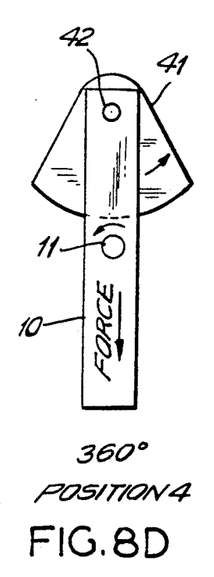

Clutch device consists of sliding plate 26, which is equipped with three pins 30 securely attached to and equally spaced on its lower surface. Sliding plate 26 slides up and down in notched grooves in large upper gear 6 and is operated by either four pneumatic or four electric actuators 27 mounted on housing 1 and shown in FIG. 6. Each actuator is equipped with a notched piston which extends through a slot in housing 1 and which loosely grips sliding plate 26 raising it or lowering it. Figures and 3 show sliding plate 26 in lowered position where it engages, through three pins 30, large lower gear 7 through three brackets 28 which are attached to large lower gear 7 and three rubber shock absorbers 29 which are attached to brackets 28 (FIG. 5). Large upper gear 6 is supported in bearing 5 which is housed in middle plate 3. Middle plate 3 is attached to housing 1. Large upper gear 6 is in mesh with three small externally toothed gears namely cam shaft gear 23, drive impeller gear 43 and idler gear 51.

Drive impeller gear 43, as shown in FIG. 3, along with drive impeller 41 are keyed and pinned to drive impeller shaft 42 which rotates in three oil impregnated bushings 44 in rocker element 10.

Idler gear 51, as shown in FIG. 2, is keyed and pinned to idler gear shaft 52 which rotates in two oil impregnated bushings 53 in rocker element 10. Lead impeller gear 33 is in mesh with idler gear 51 and along with lead impeller 31 is keyed and pinned to lead impeller shaft 32 which rotates in three oil impregnated bushings 34 in rocker element 10. Lead impeller 31 rotates in a direction which is opposite to and synchronized with that of the drive impeller 41.

Cam shaft gear 23, as shown in FIG. 2, is keyed and pinned to cam shaft 21, which rotates in three oil impregnated bushings 24 in bottom plate 4 and top plate 2.

Cam shaft 21 is herein described as a shaft with a cam machined on a designated portion of its surface. Cam shaft 21 is secured in position by two collars 22 located at each end of shaft. Cam shaft 21, when rotating in slot, provided in rocker element 10, slide pushes it at a constant acceleration deceleration rate first in one direction then in the opposite direction so as to produce a rocking motion.

Rocker element 10, shown in FIG. 2, equipped with two oil impregnated bushings 12 one on each end rock about main shaft 11 which extends along the axis of large upper gear 6 and is snugly attached to top plate 2 and bottom plate 4. Rocker element 10 is comprised of a slot, in which cam shaft 21 rotates causing it to rock, and two grooves, an upper groove in which impellers rotate and a lower groove which is used to house small gears.

FIGS. 7A through 7D show the cycle of the lead impeller 31 and FIGS. 8A through 8D show the cycle of the drive impeller 41 when the large upper gear 6 rotates in a counter clockwise direction. It should be noted that lead impeller 31 rotates in a direction which is opposite to and synchronized with that of the drive impeller 41. The cycle for the lead impeller 31 is such that the rocking sometimes occurs so that it pulls against the centrifugal force generated not so for the drive impeller 41. Both impellers generate a modified elliptical curve with the shape of the top of the ellipse different from that of the bottom of the ellipse. Both impellers will generate a linear force, but, for any given set of conditions the force generated by the lead impeller cycle is many times greater than that generated by the drive impeller cycle.

The purpose of the cam shaft 21 is to direct impellers and rocker element 10 to a precise position, as shown on FIGS. 7A through 7D and 8A through 8D, while permitting the rocker element 10 to rock. It should be noted that the maximum rotational speed of the impellers is achieved when rocker element 10 travels in a clockwise direction and large upper gear 6 travels in a counter clockwise direction and the minimum rotational speed when both rocker element 10 and large upper gear 6 travel in counter clockwise direction.

Figure 9:
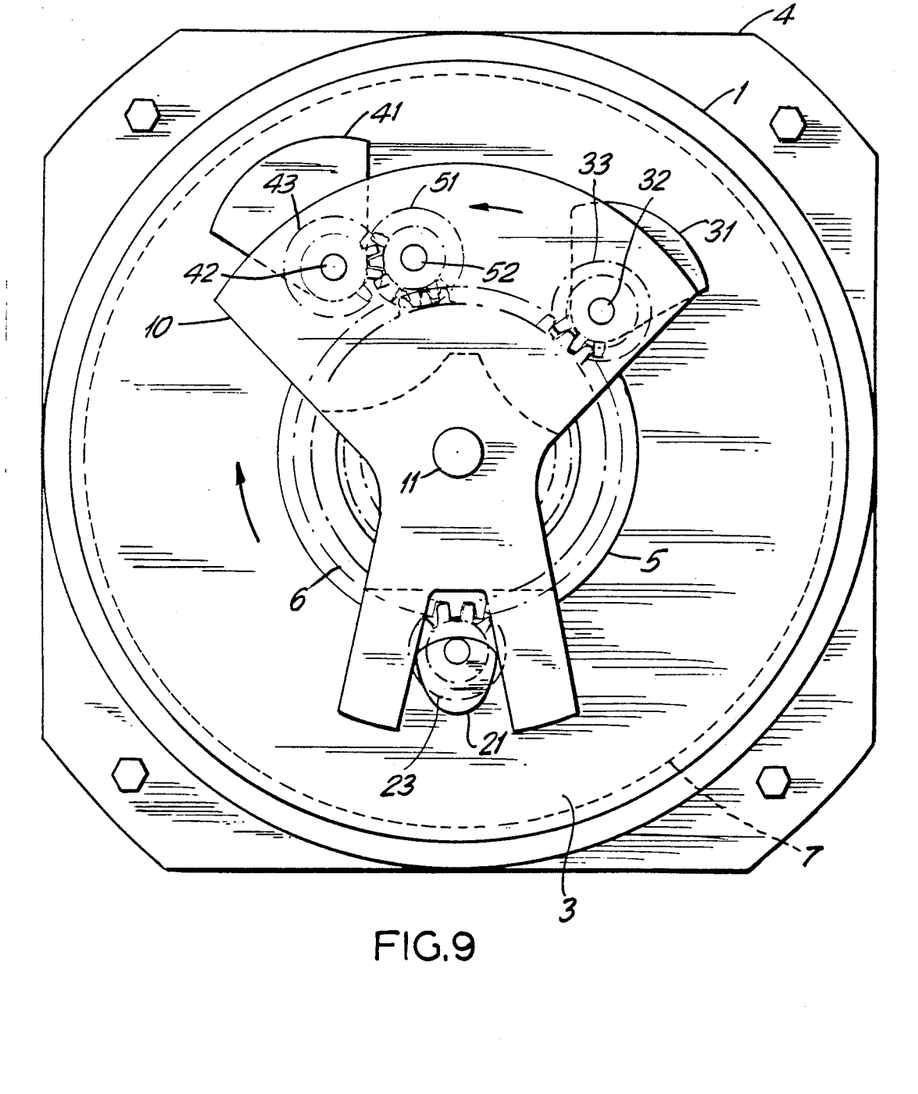
FIG. 9 is the top view of another embodiment of my machine (with the top plate removed).

FIG. 9 is another embodiment of my transmission device with externally toothed large upper gear 6 substituted for internally toothed large upper gear 6.

It is to be realized that the embodiments herein described are but a few of many that can utilize the principles of the present invention and it is not intended to limit the invention to these specific embodiments as the invention encompasses all embodiments falling within the scope and spirit of the appended claims.

Having described my invention I claim:

1. A transmission device for converting rotational torque into linear force comprising a combination large internally toothed annular gear and large flywheel rotatable within a housing by bearing means, in operative interconnection with a small externally toothed circular gear mounted within its annulus and provided with a source of variable rotary motion for driving the annular gear, a second large internally toothed annular gear, located above the first said annular gear, rotatable within a housing by bearing means and provided with a clutch connection to first annular gear, is in operative connection with three small externally toothed circular gears driven by the second annular gear, a member pivotably supported along the axis of the annular gear and rockable on the axis, said member having an upper and a lower arm, the upper arm in interconnection with two of the respective gears and the lower arm in interconnection with one of the respective gears, said gears driven by the second annular gear, in upper arm said gears causing the rocker element to move two off-centered weights, the first weight rotatable with one of the said gears, the second weight rotatable in the opposite direction and mounted within the rocker element driven by an additional small externally toothed circular gear in mesh with one of the said small gears, said weights generating centrifugal forces, the other said gear in interconnection with the lower arm of rocker element driven by the second annular gear causing the rocker element to rock by means of a cam shaft which imparts a constant acceleration motion to the rocker element, said cam shaft to consist of a shaft with a cam machined on a portion of its surface, said cam to rotate in a slot provided in rocker element, said cam shaft having means for limiting the motion of the rocker element in both clockwise and counterclockwise directions, said cam shaft causing one of the weights to pull opposite to that of the centrifugal force generated for part of the cycle, during the course of rocking the rotatable off-centered weights will be caused to regularly increase its speed when traveling in a direction opposite to that of the annular gear and decrease its speed when traveling in the same direction as the annular gear, said elements being housed within a supportive and protective casing.

2. A transmission device for converting rotational torque into linear force comprising a combination large internally toothed annular gear and large flywheel rotatable within a housing by bearing means, in operative interconnection with a small externally toothed circular gear mounted within its annulus and provided with a source of variable rotary motion for driving the annular gear, a large externally toothed annular gear, located above the internally toothed annular gear, rotatable within a housing by bearing means and provided with a clutch connection to internally toothed annular gear, is in operative connection with three small externally toothed circular gears driven by the externally toothed annular gear, a member pivotably supported along the axis of the annular gear and rockable on the axis, said member having an upper and a lower arm, the upper arm in interconnection with two of the respective gears and the lower arm in interconnection with one of the respective gears, said gears driven by the externally toothed annular gear, in upper arm said gears causing the rocker element to move two off-centered weights, the first weight rotatable with one of the said gears, the second weight rotatable in the opposite direction and mounted within the rocker element driven by an additional small externally toothed circular gear in mesh with one of the said small gears, said weights generating centrifugal forces, the other said gear in interconnection with the lower arm of rocker element driven by the externally toothed annular gear causing the rocker element to rock by means of a cam shaft which imparts a constant acceleration motion to the rocker element, said cam shaft to consist of a shaft with a cam machined on a portion of its surface, said cam to rotate in a slot provided in rocker element, said cam shaft having means for limiting the motion of the rocker element in both clockwise and counterclockwise directions, said cam shaft causing one of the weights to pull opposite to that of the centrifugal force generated for part of the cycle, during the course of rocking the rotatable off-centered weights will be caused to regularly increase its speed when traveling in a direction opposite to that of the annular gear and decrease its speed when traveling in the same direction as the annular gear, said elements being housed with a supportive and protective casing.

3. The transmission as set forth in claim 1 wherein one lead type impeller, which is herein defined as an impeller which when rotating will pull opposite to that of the centrifugal force it generates for half the cycle and pull the rocker element for the other half of the cycle, is used.

4. The transmission as set forth in claim 2 wherein one lead type impeller, which is herein defined as an impeller which when rotating will pull opposite to that of the centrifugal force it generates for half the cycle and pull the rocker element for the other half of the cycle, is used.

5. The transmission as set forth in claim 1 wherein one drive type impeller, which is herein defined as an impeller in which the centrifugal force it generates always pulls the rocker element, is used.

6. The transmission as set forth in claim 2 wherein one drive type impeller, which is herein defined as an impeller in which the centrifugal force it generates always pulls the rocker element, is used.

7. The transmission as set forth in claim 1 wherein two rocker elements each with one lead type impeller are used, with the first rocker element positioned atop the second rocker element, rocker elements and impellers shall be positioned exactly half a cycle out of phase, such that the first rocker element and impeller will always be an exact mirror image of the second rocker element and impeller.

8. The transmission as set forth in claim 2 wherein two rocker elements each with one lead type impeller are used, with the first rocker element positioned atop the second rocker element, rocker elements and impellers shall be positioned exactly half a cycle out of phase, such that the first rocker element and impeller will always be an exact mirror image of the second rocker element and impeller.

9. The transmission as set forth in claim 1 wherein two rocker elements each with one drive type impeller are used, with the first rocker element positioned atop the second rocker element, rocker elements and impellers shall be positioned exactly half a cycle out of phase, such that the first rocker element and impeller will always be an exact mirror image of the second rocker element and impeller.

10. The transmission as set forth in claim 2 wherein two rocker elements each with one drive type impeller are used, with the first rocker element positioned atop the second rocker element, rocker elements and impellers shall be positioned exactly half a cycle out of phase, such that the first rocker element and impeller will always be an exact mirror image of the second rocker element and impeller.

11. The transmission as set forth in claim 1 wherein the gear pitch diameter of the second large internally toothed annular gear is larger than the gear pitch diameter of the first large internally toothed annular gear and large flywheel.

12. The transmission as set forth in claim 2 wherein the gear pitch diameter of the large externally toothed annular gear is larger than the gear pitch diameter of the large internally toothed annular gear and large flywheel.

* * * * *